R. CAMBER.
POTATO HARVESTER.
APPLICATION FILED APR. 24, 1916.
1,215,480.
Patented Feb. 13, 1917.
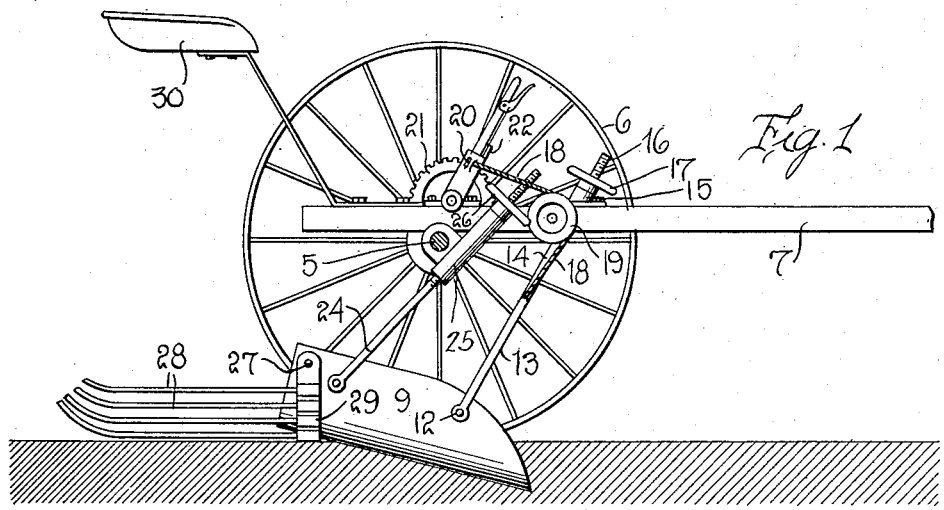
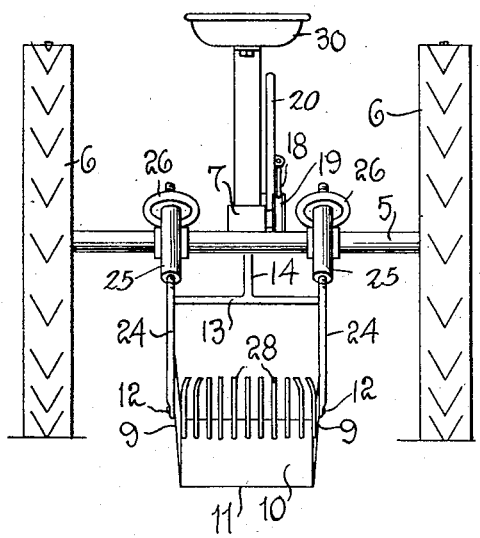
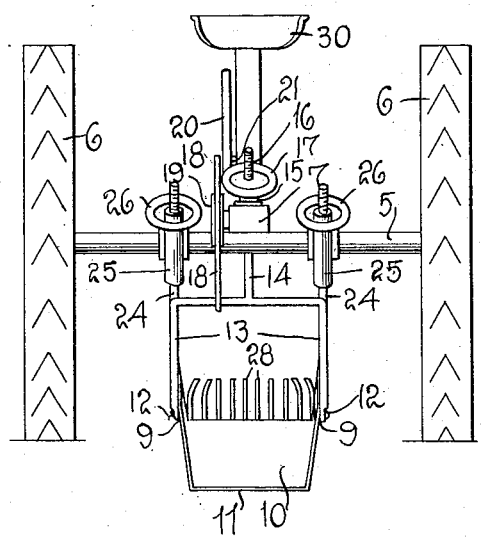
Inventor
R. CAMBER
By Watson E. Coleman
Attorney

UNITED STATES PATENT OFFICE.

RICHARD CAMBER, OF HESPERIA, MICHIGAN.

POTATO-HARVESTER.

1,215,480.  Specification of Letters Patent.  Patented Feb. 13, 1917.

Application filed April 24, 1916. Serial No. 93,277.

*To all whom it may concern:*

Be it known that I, RICHARD CAMBER, a citizen of the United States, residing at Hesperia, in the county of Oceana and State of Michigan, have invented certain new and useful Improvements in Potato-Harvesters, of which the following is a specification, reference being had to the accompanying drawings.

This invention relates to potato harvesters.

One object of the invention is to provide a machine comprising few parts, simple and strong in construction, and one that will require little repair in use.

Another object is to provide a machine that will effectually dig and clean potatoes and other vegetables and afterward discharge them in a convenient manner ready for gathering, leaving the ground substantially smooth, after digging.

A further object is to provide a machine wherein the shovel may be adjusted to a variety of positions for different digging depths.

It is another important object of my invention to provide simple and easily operated means for elevating the harvesting shovel at the end of a row when it is desired to turn the machine.

The invention comprises an axle on which are mounted wheels, a tongue connected with the axle, said tongue and axle being suitably braced, a shovel, a plurality of spaced adjusting members connected to the sides of the shovel, means connected to one of the adjusting members adapted to raise and lower the front end of the shovel, and a separator frame comprising a substantially U-shaped member pivotally mounted near the upper edges of the sides of the shovel and spaced from one of the adjusting members, said U-shaped frame adapted to hold securely a plurality of extended tines or screen fingers, whose free ends are slightly bent or curved to provide a suitable discharge end.

A practical form of the invention is illustrated in the accompanying drawings, in which, Figure 1 is a side elevation;

Fig. 2 is a rear elevation;

Fig. 3 is a front elevation.

The invention embodies an axle 5 of suitable form and construction and at the extremities thereof are mounted suitable wheels 6. These wheels may be of the usual form embodying a rather wide tread having angular lugs positioned upon the periphery. Secured to the axle, in any preferred manner, is a tongue 7.

A shovel member is provided with the sides 9 and a bottom 10 over which the material passes when dug up from the ground by means of the point 11. The sides 9 of the shovel are preferably formed with a curved or rounded edge from the top portion of the side adjacent the point 11 of the shovel.

The arms of a yoke member 13 are pivotally connected as at 12 to the sides 9 of the shovel at the forward end thereof. The yoke member 13 is centrally formed with a stem 14 which extends upwardly and through a guide sleeve 15 fixed to the tongue 7. The stem 14 is preferably threaded at its upper end, as indicated at 16. To coöperate with these screw threads formed on the stem 14, a suitable hand wheel 17 is provided. This hand wheel is preferably disposed on the top side of the tongue to act as a stop member for the downward movement of the yoke 13 and the stem 14. Thus it will be apparent that the shovel point may be readily raised or lowered and the depth to which the same will penetrate the ground varied, as desired.

In order to lift the shovel when at the end of a row and it is desired to turn the machine around and start operations upon another row, the yoke member 13 and its stem 14 are adapted to be lifted by suitable means which will permit the raising and lowering, as desired. One means is shown as comprising a cable 18 which is secured to the yoke at some convenient point passing over an idler pulley 19 and is secured to the lever 20 which is pivotally mounted for convenience on the tongue 7. To coöperate with the lever and the yoke to hold the shovel in several positions, a quadrant 21 is provided which may be mounted in any suitable manner upon the tongue 7. The lever 20 carries a manually operated locking dog 22 for engagement with the teeth of the rack or quadrant 21.

The shovel is suspended at its rear end from the axle 5 by means of the spaced rods 24. These rods extend loosely through the sleeves 25 mounted in spaced relation to each other in any suitable manner upon the axle 5, said sleeves being angularly disposed with respect to the tongue 7 in the same relative direction as the sleeve 15 mounted in said tongue. The upper ends of these members 24 are preferably threaded to receive suitable hand wheels 26. By means of these hand wheels the rear end of the shovel and a separator frame pivotally connected thereto are vertically adjusted. Any preferred means may be employed for mounting and securing the sleeves 15 and 25 upon the axle and tongue respectively of the machine.

At the rear end of the shovel, there is mounted a suitable separator frame which is pivotally connected to the upper edges of the sides of the shovel, as shown at 27. The separator frame 29 is preferably U-shaped and has extending from it suitable tines or screen fingers 28. These tines or fingers are or may be secured to the frame in any suitable manner which will hold them in their extended relation, said tines at their outer ends being curved or bent upwardly.

Positioned rearwardly of the axle and preferably mounted upon the tongue is a seat 30 which may be of any convenient type or shape suitable for the purpose.

In practical operation the rear adjusting members are lowered or raised by means of their hand wheels 26 to position the rear end of the shovel at a convenient height from the ground and the yoke member 13 is also adjusted for the depth of cut by means of the hand wheel 17, at which time the lever to which the cable is attached, is released. When it is desired to dump the frame at the several convenient points, the lever is actuated to raise the front end of the shovel by means of the yoke 13 which will cause the shovel to rotate between the rear adjusting rods 24. The lever is also useful in elevating the point of the plow when the end of the row is reached, thus raising the shovel clear of the ground. In operation, the ground behind the harvester is left in a more or less flat condition.

After the several adjustments have been made for angularly positioning the shovel and regulating the depth of cut, as the harvester is drawn forward, the point 11 enters the ground, and cuts off the top of the hill. As it moves forward, this particular hill is moved upward on the floor of the shovel and finally is pushed on to the separator frame where the dirt is effectually separated from the vegetables which, for instance, may be potatoes.

In the movement of the vegetables across this frame, they are thoroughly cleaned and the dirt sifts downwardly between the tines 28. The clean vegetables may be readily dumped from the separator or screen 28 and deposited on the ground at convenient intervals by raising the shovel to an inoperative position by the adjustment of the hand wheels 26 and 17, and then adjusting the yoke 13 by turning the hand wheel 17 to depress the forward end of the shovel so that the potatoes will roll by gravity from the shovel and be deposited on the ground.

I have herein referred to one means for adjustably suspending the shovel and separator carried thereby from the tongue and axle of the machine but it is, of course, manifest that various other alternative constructions may be provided which would give equal satisfaction in practical use. The invention is also susceptible of many other modifications in the form, proportion and arrangement of the various parts as may be fairly embodied within the spirit and scope of the invention as claimed.

What I claim is:—

1. A harvesting machine including a wheeled frame having an axle and tongue, a shovel, means vertically adjustable upon the wheel axle in which the rear end of the shovel is pivotally mounted to position said shovel with respect to the ground, a rearwardly projecting separator connected to the rear end of the shovel, and additional means adjustably mounted in the tongue and connected to the forward end of the shovel to raise or lower the same.

2. A harvesting machine of the character described including a wheeled supporting frame, a shovel, relatively fixed guides carried by the frame, rods pivotally connected to the rear end of the shovel and extending through said guides, adjustable stops on the rods to limit their downward movement through the guides, a separator pivotally connected to the rear end of the shovel, and means adjustably mounted in the frame and operatively connected to the forward end of the shovel to raise or lower the same.

3. A harvesting machine of the character described including a wheeled frame, a shovel, spaced guide sleeves mounted in the frame, rods loosely movable through said sleeves and pivotally connected at their lower ends to the rear end of the shovel, adjustable stops threaded upon the upper ends of the rods to limit their downward movement through the sleeves, means for suspending the forward end of the shovel from the frame, and manually operable means mounted in the frame and connected to said suspending means to raise the same and elevate the forward end of the shovel.

4. A harvesting machine of the character described including a wheeled frame having an axle and a tongue, a shovel, means adjustably mounted upon the axle and pivotally connected to the rear end of the shovel to raise or lower the same, a rearwardly projecting separator pivotally connected to the rear end of the shovel, adjustable means mounted in the tongue and operatively connected to the forward end of the shovel to raise or lower the same, a manually operable lever mounted upon the frame, and a flexible connection between said lever and said last named means to elevate the forward end of the shovel to an inoperative position.

In testimony whereof I hereunto affix my signature in the presence of two witnesses.

RICHARD CAMBER.

Witnesses:
　PEARL THOMPSON,
　CLARK MILLS.

Copies of this patent may be obtained for five cents each, by addressing the "Commissioner of Patents, Washington, D. C."